Figure 1:
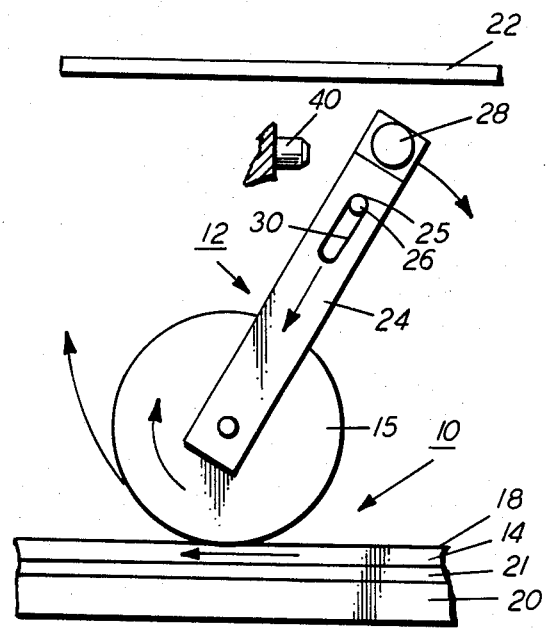

United States Patent [19]

Jones

[11] Patent Number: 4,534,551
[45] Date of Patent: Aug. 13, 1985

[54] DOCUMENT BELT NORMAL FORCE CONTROL

[75] Inventor: Jack E. Jones, Macedon, N.Y.

[73] Assignee: Xerox Corporation, Stamford, Conn.

[21] Appl. No.: 499,935

[22] Filed: Jun. 1, 1983

[51] Int. Cl.$^3$ .............................................. B65H 5/02
[52] U.S. Cl. .................................. 271/275; 198/722; 355/3 S; 271/DIG. 9; 271/902
[58] Field of Search ................ 271/275, 233, DIG. 9; 355/3 SH, 75, 76; 198/722

[56] References Cited

U.S. PATENT DOCUMENTS 4,146,219 3/1979 Phillips ................................ 271/233
4,353,541 10/1982 Parzygnat ........................... 271/275

OTHER PUBLICATIONS

Xerox Disclosure Journal, "Belt Energized Antiskew Rolls", Victor Castro-Hahn, vol. 6, No. 6, Nov./Dec. 1981, p. 345.

*Primary Examiner*—George E. A. Halvosa
*Assistant Examiner*—John A. Carroll

[57] ABSTRACT

In a document transport apparatus for feeding document sheets over a copier platen with a reversible direction of motion document feeding belt with a normal-force pressure system for applying pressure to an area of the back of the lower belt flight, mounted to engage and be moved by the belt, which pressure is automatically substantially greater for one direction of motion of the belt than the other, the improvement comprising apparatus for applying a preset maximum gravitational force with the pressure system actuated solely by engagement and movement of the pressure system by the lower belt flight in one direction, and further apparatus for counteracting that gravitational force automatically in response to the reversal of direction of the belt flight to greatly reduce the applied pressure in the reversed direction of motion of the belt flight, wherein a disclosed pressure system is an integral arm/roller unit with a variable axis of rotation about a fixed pivot by means of a limited slot connection therewith and a cooperative rotational stop, providing free vertical but restricted rotational movement of the pressure system in one direction of belt movement, and vertical retention but free rotational movement in the other direction of belt movement.

6 Claims, 2 Drawing Figures

DOCUMENT BELT NORMAL FORCE CONTROL

This is an improvement in means for automatically changing a document feeding belt normal force with feeding direction. It is particularly suited for copier document handling apparatus for feeding original document sheets to and from the imaging station of a copier with a document feeding belt system, in which an increased feeding force is provided between the belt system and the document sheet for one direction of belt movement as opposed to the opposite direction of belt movement.

The present invention is an improvement in such systems, and particularly in automatically self-activating said systems as exemplified by Xerox Disclosure Journal Vol. 6, No. 6 p. 345, published November/December 1981; U.S. Pat. No. 4,146,219 issued Mar. 27, 1979 to Kenneth G. Phillips; and U.S. Pat. No. 4,353,541 issued Oct. 12, 1982 to W. J. Parzygnat, and the additional disclosures cited and incorporated in said U.S. Pat. No. 4,353,541.

Due to the increase in copying rate or speed of xerographic and other document copiers now in commercial use, and the desirability of providing for the automatic or semi-automatic handling of a wide variety of sizes, weights, thicknesses, materials and conditions of original document sheets, the rapid feeding and registration of such document sheets to and from the proper copying position at the imaging station of the copier has been difficult to achieve without damaging or misregistering the documents. The documents must also be rapidly removed after copying for the copying of the next document in order to keep up with the copying rate of the copier. It is also desirable to provide a document handling system which is readily removable to allow conventional manual document placement on the copier imaging station.

Typically, the document sheet is registered by driving one or two edges of the document against gates or stops which may comprise projecting aligned fingers or a fixed or removable vertical registration surface, against which the edge of the sheet is driven into alignment. An important function of such a registration gate or stop is to deskew the moving document, i.e. to properly align it as well as to control its imaging position on the transparent copying window or platen as it is commonly called. Typically, this document feeding to and from the copying registration position is done with a document belt or belts.

Both the frictional characteristics and the normal force with which the document belt presses against the document are quite critical. When the document sheet is being registered by being driven against a registration edge, some slippage must normally be provided between the document feed belt and the document to allow the document to rotate to deskew and to prevent the document edge from being crumpled or damaged by being overdriven against the registration stop. On the other hand, when the document is being fed onto and off of the imaging station, slippage between the belt and the document is generally undesirable. It can cause skewing or misfeeding of the document, particularly during the initial acceleration of the document.

Accordingly, it is known in the art to provide a document handling system in which a pressure roller is pressed against the inside or back of the document belt flight over the copier imaging station to increase the normal force between the document feed belt and the copy sheet at selected areas of the belt. In particular, it is known in the art that this normal force of increased pressure may desirably be greater in one direction of movement of the belt than the other, so as to provide less of such normal force pressure against the belt when the belt is moving the document sheet against a registration edge, and more such pressure when the belt is moving in the opposite direction to feed the document. Of particular interest in that regard is the above-cited U.S. Pat. No. 4,146,219 issued Mar. 27, 1979 to K. G. Phillips. Note especially FIG. 3, Col. 6 and the variable pressure roller mechanism 400 disclosed therein. Also noted is U.S. Pat. No. 4,146,220 issued Mar. 27, 1979 to P. Barton, particularly roller 301 and FIG. 4 therein.

The actuation of the selectable (variable) normal force pressure roller against the document belt is known to be achievable by the use of an electrical solenoid, although this, of course, entails additional expense both for the solenoid and its power supply and its controls. Examples are disclosed in the "Xerox Disclosure Journal" Vol. 4, No. 6, November/December 1979, pages 751–752; U.K. Patent Application No. 2040887A published September 1980 by R. M. Nekula (Xerox); Japanese Application No. 52-40193 filed Apr. 8, 1977 and laid open Nov. 1, 1978 as Laid Open No. 53-125025 by Ricoh, and its German equivalent Application No. 28 15 174 and other equivalents; Japanese Application No. 53-82388 filed June 17, 1978 and laid open Dec. 27, 1979 as Laid Open No. 54-184127 by Copia Co., Ltd. Direct electrical solenoid engagement of a roller with a document is disclosed in U.S. Pat. No. 3,532,338 issued Oct. 6, 1970 to P. R. Brinson, et al.

The following U.S. Patents are cited merely by a way of background for document feeding systems, document belts and normal force roller applications therewith: U.S. Pat. Nos. 3,899,943 issued June 17, 1975 to H. J. Krayer; 3,895,790 issued July 22, 1975 to A. Hoyer, et al.; 3,910,570 issued Oct. 7, 1975 to C. D. Bleau; 3,941,376 issued Mar. 2, 1976 to K. E. Liechty, et al.; 3,944,209, 3,944,213 and 3,944,214 all issued Mar. 16, 1976 G. Fallos, et al.; and 4,023,791 issued May 17, 1977 to T. Hori, et al.

All of the patents, products and other references cited herein are incorporated by reference for this disclosure, including their teachings of appropriate or alternative uses or applications, or associated apparatus.

One important application of the present invention is in a known document handling system, as for example, the Xerox "5600" copier, or that shown in Xerox U.S. Pat. Nos. 3,504,908 issued Apr. 7, 1970 to J. R. Krueger and 4,076,233 issued Feb. 28, 1978 to C. Knight et al. and other patents noted above. In such systems the document is fed onto one side of the imaging station of the copier by the document belt in one direction of belt motion, which belt motion is reversed for registering the document against the registration edge of the platen and then, after copying, the document is ejected from the platen by another reversal movement of the belt onto the original feeding direction, i.e. the document is fed off of the platen by the document belt in the opposite direction from which the document was moved into registration. As in the "5600" copier, this may include the use of a fixed registration edge rather than a retractable registration edge or gate, and the feeding in of the document from that same side of the platen over that registration edge, then the reversal of the document belt briefly to back the rear or trail edge of the document up against that registration edge, and then driving the document off of the platen from the side thereof opposite from the registration edge. This document feeding system is particularly useful where it is desirable to provide "stream feeding" and/or document recirculation. Since each document sheet enters from one side of the platen and departs from the other side of the platen, the subsequent document can be fed onto the platen simultaneously with the feeding off of the previously copied document. With this system it is particularly important that the copied document be positively ejected without slippage or skewing so that it will not remain on the platen and interfere with the incoming next document sheet, and so that the ejected document may be fed into a stack unskewed for subsequent recirculation back to the platen. This necessitates a positive, substantially nonslip, engagement of the document belt with the document sheet for feeding. However, as discussed above, slippage must be provided for the brief reverse deskewing and registration movement, of the document belt. The present invention is particularly applicable to such a system (although not limited thereto) because it provides automatic, rapid, and positive application of additional pressure between the belt and the document to prevent or decrease slippage or skewing during the document feeding, particularly the document ejection, but automatically removes this increased pressure to allow document slippage relative to the belt during the reverse, registration, movement of the belt and then automatically reapplies the pressure as soon as the belt reverses direction to feed the copy sheet off of the platen with a greatly increased normal force to prevent slippage. The present system is particularly suited to automatically accommodate a wide range of document sheet weights or thicknesses because it is positionally insensitive yet has very consistent preset applied normal force.

It may be seen that the apparatus disclosed herein is of particular application to any document handling system in which the direction of the document belt in ejecting the document from the platen is opposite to the belt direction for driving the document with slippage against the registration edge, because the present invention automatically provides for a substantial difference in the force between the document belt and the document in direct mechanical response to the direction of motion of the belt, without requiring electrical solenoids or other complex mechanisms. The system disclosed herein can provide a precise and constant normal force against the belt at a fixed and constant position whenever the belt is moving in one selected direction, but can immediately and positively remove that normal force pressure against the belt as soon as, and as long as, the belt is driven in the opposite direction. As disclosed herein, plural, spaced normal force systems may be provided if desired.

Unlike some of the above-disclosed prior art systems, such as the cited 4,353,541, the disclosed system does not require contact with or deformation of any component of the document transport other than the actual document engaging belt flight. Nor does the present system require spring-loaded wheels or high frictional forces or potentially uncontrolled wheel tilting because of an indefinite or unfixed axis rotation in the direction of belt movement. Nor does the present system utilize a variable wedging or pinching force, but rather has a constant preset maximum normal force, provided by a simple gravity controlled mechanism.

A general feature disclosed herein is to provide, in a document platen transport belt system having means to automatically reduce the belt normal force against the document for movement of the belt in one direction as compared to the opposite belt direction, comprising document belt normal force means for engaging the belt flight which engages the document, the improvement comprising means for automatically reducing the normal force applied to said belt by said belt normal force means solely by the movement of said belt normal force means by engagement solely with said document engaging flight of said belt in said one direction.

It is a preferred feature of the present invention, as disclosed in the example hereinbelow, to provide in a document transport apparatus for reversibly feeding document sheets with a reversible direction of motion document feeding belt means having a document engaging belt flight for said document feeding and pressure means for applying pressure to an area of the back of said belt flight, which pressure is automatically substantially greater for one direction of motion of said belt means than the other, said pressure means being mounted to engage and be moved by said document feeding belt means, the improvement comprising: first means for applying a preset maximum gravitational force with said pressure means to said document imaging belt flight actuated solely by engagement and movement of said pressure means by movement of said belt flight in one direction, and second means for counteracting said gravitational force of said pressure means automatically in response to the reversal of direction of said belt flight of said belt means to apply a greatly reduced pressure to said belt flight only in said reversed direction of motion of said belt flight.

Further disclosed features are wherein said belt flight is overlying a platen of a copier for feeding original document sheets thereover, and in which said pressure means comprises an arm and at least one pressure roller rotatably mounted on said arm and both pivotable and vertically movable with said arm relative to said belt flight; in which said pressure means has a variable axis of rotation about a fixed pivot means; in which said first means comprises means for holding said pressure means in a first rotational position for one direction of belt movement providing vertically unrestrained vertical movement of said pressure means against said belt flight in said first position to increase its weight on said belt flight; and in which said second means comprises means for partially supporting the weight of said pressure means by restraining its downward movement when said pressure means is in a second rotational position; wherein said first means comprises a vertical slot freely vertically slideably engaging a fixed pivot member when said pressure means is in a first, generally vertical, position, and a rotational stop positioned to prevent said pressure means from moving in one direction of belt movement beyond said first position; and wherein said second means comprises a preset limit to said vertical slot for engaging said fixed pivot member at a second and different position of said pressure means at a substantial angle from the vertical and counterweight means for subtracting from the pressure applied by said pressure means to said belt flight in said second position, and for adding to the pressure applied to said belt by said pressure means in said first position.

Figure 2:
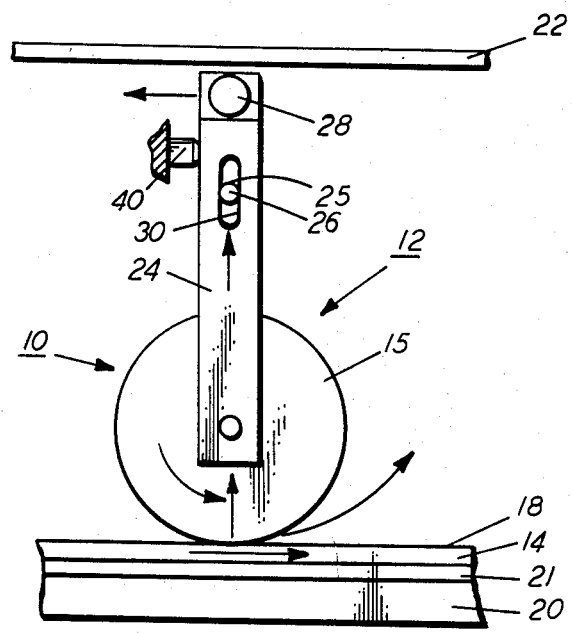

The invention will be better understood by reference to the following description of a specific example thereof including the following drawing figures (approximately to scale) wherein:

FIG. 1 is a side view of an exemplary normal force control apparatus in accordance with the present invention with a document belt moving in one direction; and FIG. 2 is the same view of the same self-actuating document belt pressure applying apparatus disclosed in FIG. 1, but with the document belt being driven in the opposite direction, illustrating the normal force applying position.

FIGS. 1 and 2 illustrate the relevant novel portions of an exemplary document handling apparatus 10 with a self energizing belt pressure applying apparatus or unit 12 for applying a lower normal force automatically to a document belt 14 when that belt 14 is moving in one direction, as in FIG. 1, and for automatically increasing that normal force when the belt 14 is moving in the opposite direction, as in FIG. 2. This variable belt backing pressure is applied by repositionable pressure roller 15 which is constantly in engagement with the back of the belt 1 over the first belt flight 18 which overlies the copier platen (imaging station) 20. In the FIG. 2 position the roller 15 is substantially increasing the force with which the first belt flight 18 engages a document sheet 21 which is between the first belt flight 18 and the copier platen 20. This provides for positive ejection of the document sheet 21 from the platen 20 by the movement of the belt 14 in one direction (to the right as shown in FIG. 2).

With the present invention, the pressure applying apparatus 12 is operated in a very simple but effective and positive manner solely by the utilization of the force of movement of the document engaging lower belt flight 18. The entire unit 12 is spaced under and out of contact with the opposite or return belt flight 22 which is conventionally substantially spaced over the first belt flight 18. Thus, the entire pressure applying unit 12 may be mounted in a small portion of this inter-belt space, over whichever specific area of the belt first flight 18 it is desired to selectively apply pressure for positive document feeding and/or skew prevention.

It may be seen that there is disclosed a very simple, integral, low cost device 12. The entire pressure applying unit 12 comprises a generally linearly extending, unitary, monolithic arm 24 to which the only other component, roller 15, is rotatably mounted adjacent one end. The arm 24 is pivotally centrally mounted to a fixed pivot pin 25 on the document handling apparatus 10 providing an axis of rotation 26 about which the arm 24, and therefore the entire integral apparatus 12, rotates. This axis of rotation 26 is provided intermediately of the first and second belt flights 18 and 22 and intermediately of the elongate arm 24 distributed mass. The arm 24 may thus be considered as having two lever portions extending in generally opposite directions from their common axis of rotation 26. The first lever is that extending generally upwardly from the axis of rotation 26 and preferably having a preset or adjustable weight 28 adjacent the upper end thereof. The second lever is that part of arm 24 which extends generally downwardly toward the interior surface of the first belt flight 18 to hold and press down upper roller 15.

The roller 15 lever action on arm 24 provides the sole actuating for the selective actuation (pivoting) of the entire apparatus 12. There is inherently a sufficient frictional horizontal force vector component from the belt 14 motion on roller 15 to move arm 24. Although a higher friction than normal bearing material can be provided for mounting roller 15 to arm 24 for this purpose, it is not necessary.

The arm 24 mounts to the pin or shaft 25 by means of an elongate vertical slot 30 centrally of arm 24. As the arm 24 (and entire unit 12) rotates from the vertical about the pin 25 axis 26 the arm 24 also slides via slot 30 relative to pin 25 until the upper end of the slot 30 is reached as in FIG. 1. There the arm 24 is stopped and partially supported by pin 25.

In contrast, in the position of FIG. 2, the pin 25 does not hold any part of the weight of the arm 24, and the entire unit 12 weight, including weight 28, acts vertically directly over the wheel 15 and therefore applies this full weight as a normal force against belt 14. The belt 14 movement holds unit 12 upright but a fixed stop 40 prevents further unit 12 counterclockwise rotation in the belt movement direction of FIG. 2.

In contrast, for belt 14 movement in the opposite direction, there is no stop, and the arm 24 is thus free to rotate away from the vertical and drop downwardly until restrained by the end stop (top position) of slot 30. At this point (FIG. 1) this pin/slot engagement has a vertical force vector absorbing (negating) most of the normal forces. I.e. the arm 24 is now "hanging" on pin 25 and only a small portion of its weight is supported by roller 15, rather than all of it as in the FIG. 2 position. Further movement of wheel 15 by belt 14 would tend to swing it out of contact. Further, in the FIG. 1 position the center of gravity of the weight 28 is now on the opposite side of pivot 26 from roller 15 and therefore is counterbalancing or unloading roller 15 with a lever action proportional to its weight and horizontal distance from the pivot point 26, which is in turn proportional to the arm 24 angle from the vertical and the length of the arm 24 from the upper end of slot 30 to the center of mass of weight 28.

The document belt 14 may be a known single, uniform, endless belt overlying the entire platen 20 to provide a uniform light reflective background against which the documents may be copied. Two said pressure applying means 12 may be spaced over two spaced minor areas along the circumferential length of the belt, i.e. on a common axis which is in the direction of motion of the belt, and centrally thereof, so that they may be mutually actuated to insure positive document ejection of different sizes of documents without skewing when in pressure engagement with said belt for one direction of belt movement, but to allow document rotation relative to the belt and relative to a registration edge by automatically reducing the normal force on the belt in its other direction of movement.

Referring further to the positive and reliable system by which the entire pressure applying unit 12 is pivoted to pivot the pressure roller 15 in and out of pressure engagement with the first belt flight 14, it is important to be able to apply increased pressure only during the document ejection, or during both document ejection and in-feeding, but to insure that this increased pressure is positively and automatically removed, or substantially reduced, during the reverse motion of the belt 14 in which the document sheet is being registered against the fixed registration edge and deskewed. During this latter reverse (registration) belt motion, as described above, it is important that the pressure between the belt 14 and the document sheet 21 be low enough to allow some, controlled, slippage therebetween so that the document sheet can deskew and not be damaged as it is driven against the registration edge in that reverse motion of the belt, especially for a thin and more delicate document. The system disclosed herein automatically provides this, without requiring any solenoids, sensors, controls, or any other associated mechanism. The pressure applying apparatus 12 automatically and positively responds to, and is solely driven by, the reversal of motion of the document belt 14, and in particular only by the movement of the lower belt flight 18 thereagainst.

The present system provides a positive acting system yet without "digging into" the belt because the belt is engaged by roller 15 with a maximum force corresponding to only the weight of the unit 12, without utilizing either spring forces or wedging or jamming force. Further it is positionally uncritical and can adjust to wide variations in belt and document thickness or position with no change in applied force, up to the length of slot 30. Yet the pressure applying apparatus 12 applies a constant, preset, normal force in one direction of motion of the belt. In the opposite direction of motion of the belt the roller 12 freely rolls on the belt with much lower force, and is effectively constantly partially pushed away from the belt 14.

The pressure applying apparatus 12 has only two stable positions, one for each direction of the belt motion, i.e. one (FIG. 2) in which pressure is applied, and the other (FIG. 1) in which it is effectively not. There is only a brief, rapid intermediate rotating movement in which the unit 12 is being positively driven, during belt motion reversal, between these two stable positions. The engagement of the belt with the roller 15 provides a moment arm initially rotating the arm 24, and therefore the entire unit 12, in the same direction as the belt movement. In the FIG. 1 stable position the arm 24 extends at an angle from the vertical, at an acute angle to the belt flight 14 and to an imaginary vertical line through the axis of rotation 26. In this FIG. 1 stable position the arm 24 is angled or pointing "downstream" of the direction of motion of the second flight 22. This is tending to rotate the roller 15 surface away from the belt flight 18 to minimize or decrease the normal force therebetween. However, whenever there is a reversal of the belt direction of motion, so that the belt 14 is moving in the opposite direction, the lever arm 24 is now pointing upstream, and these force vector relationships are reversed to increase both the horizontal and vertical forces between the roller 15 and the belt, and to aid in the rotation of the unit 12 into its upright (FIG. 2) position.

As shown in FIG. 2, the maximum degree or extent of rotation of the unit 12 in one direction is restricted by a fixed stop 40, preferably resilient. The stop 40 and the arm 24 are so positioned and configured relative to the axis of the pressure roller 15 and axis 26 so that the arm 24 will have pivoted into a vertical and maximum belt pressure position when the stop 40 is engaged.

However, immediately upon the reversal again of the belt motion, even a relatively small amount of friction between the belt and the roller 15 is sufficient initiates the movement of the arm 24 in the new direction of belt motion. This rotates the arm 24 about the axis of rotation 26 from the FIG. 2 position back to the FIG. 1 position.

It will be appreciated that various alternatives, refinements, improvements, variations or modifications may be provided in the disclosed embodiment by those skilled in the art, and they are intended to be encompassed by the following claims:

What is claimed is:

1. In a document transport apparatus for reversibly feeding document sheets with a reversible direction of motion, document feeding belt means having a document engaging lower belt flight, and having pressure means for applying pressure to an area of the back of said lower belt flight, which pressure is automatically substantially greater for one direction of motion of said belt means than the other, said pressure means being mounted to engage and be moved solely by said lower belt flight, the improvement comprising:

first means comprising a pivotable lever for applying a preset maximum solely gravitational force with said pressure means to said document imaging lower belt flight, said first means being actuated solely by said engagement and movement of said pressure means by movement of said lower belt flight in one direction of motion, and second means for counteracting said gravitational force of said pressure means automatically in response to the reversal of direction of said lower belt flight of said belt means to apply a greatly reduced pressure to said lower belt flight only in said reversed direction of motion of said lower belt flight.

2. A document transport apparatus according to claim 1 in which said pressure means has a variable axis of rotation about a fixed pivot means.

3. A document transport apparatus according to claim 1 in which said first means comprises means for holding said pressure means in a first rotational position for one direction of belt movement providing vertically unrestrained vertical movement of said pressure means against said lower belt flight in said first position to increase its weight on said lower belt flight; and in which said second means comprises means for partially supporting the weight of said pressure means by restraining its downward movement when said pressure means is in a second rotational position.

4. In a document transport apparatus for reversibly feeding document sheets with a reversible direction of motion document feeding belt means having a document engaging belt flight for said document feeding, and pressure means for applying pressure to an area of the back of said belt flight, which pressure is automatically substantially greater for one direction of motion of said belt means than the other, said pressure means being mounted to engage and be moved by said document feeding belt means, the improvement comprising:

first means for applying a preset maximum gravitational force with said pressure means to said document imaging belt flight actuated solely by engagement and movement of said pressure means by movement of said belt flight in one direction, and second means for counteracting said gravitational force of said pressure means automatically in response to the reversal of direction of said belt flight of said belt means to apply a greatly reduced pressure to said belt flight only in said reversed direction of motion of said belt flight;

said belt flight overlying a platen of a copier for feeding original document sheets thereover, and said pressure means comprising a pivotable and vertically movable arm and at least one pressure roller rotatably mounted on and movable with said arm relative to said belt flight.

5. In a document transport apparatus for reversibly feeding document sheets with a reversible direction of motion document feeding belt means having a document engaging belt flight for said document feeding, and pressure means for applying pressure to an area of the back of said belt flight, which pressure is automatically substantially greater for one direction of motion of said belt means than the other, said pressure means being mounted to engage and be moved by said document feeding belt means, the improvement comprising:

first means for applying a preset maximum gravitational force with said pressure means to said document imaging belt flight actuated solely by engagement and movement of said pressure means by movement of said belt flight in one direction, and second means for counteracting said gravitational force of said pressure means automatically in response to the reversal of direction of said belt flight of said belt means to apply a greatly reduced pressure to said belt flight only in said reversed direction of motion of said belt flight;

said first means comprising a vertical slot freely vertically slideably engaging a fixed pivot member when said pressure means is in a first, generally vertical, position, and a rotational stop positioned to prevent said pressure means from moving in one direction of belt movement beyond said first position;

and wherein said second means comprises a preset limit to said vertical slot for engaging said fixed pivot member at a second and different position of said pressure means at a substantial angle from the vertical and counterweight means for subtracting from the pressure applied by said pressure means to said belt flight in said second position, and for adding to the pressure applied to said belt by said pressure means in said first position.

6. In a document transport apparatus for reversibly feeding document sheets with a reversible direction of motion document feeding belt means having a document engaging belt flight for said document feeding, and pressure means for applying pressure to an area of the back of said belt flight, which pressure is automatically substantially greater for one direction of motion of said belt means than the other, said pressure means being mounted to engage and be moved by said document feeding belt means, the improvement comprising:

first means for applying a preset maximum gravitational force with said pressure means to said document imaging belt flight actuated solely by engagement and movement of said pressure means by movement of said belt flight in one direction, and second means for counteracting said gravitational force of said pressure means automatically in response to the reversal of direction of said belt flight of said belt means to apply a greatly reduced pressure to said belt flight only in said reversed direction of motion of said belt flight;

said belt flight overlying a platen of a copier for feeding original document sheets thereover, and said pressure means comprising an arm and at least one pressure roller rotatably mounted on said arm and both pivotable and vertically movable with said arm relative to said belt flight; in which said pressure means has a variable axis of rotation about a fixed pivot means; in which said first means comprises means for holding said pressure means in a first rotational position for one direction of belt movement providing vertically unrestrained vertical movement of said pressure means against said belt flight in said first position to increase its weight on said belt flight; and in which said second means comprises means for partially supporting the weight of said pressure means by restraining its downward movement when said pressure means is in a second rotational position; wherein said first means comprises a vertical slot freely vertically slideably engaging a fixed pivot member when said pressure means is in a first, generally vertical, position, and a rotational stop positioned to prevent said pressure means from moving in one direction of belt movement beyond said first position; and wherein said second means comprises a preset limit to said vertical slot for engaging said fixed pivot member at a second and different position of said pressure means at a substantial angle from the vertical and counterweight means for subtracting from the pressure applied by said pressure means to said belt flight in said second position, and for adding to the pressure applied to said belt by said pressure means in said first position.

* * * * *